US006386766B1

(12) United States Patent
Lee

(10) Patent No.: US 6,386,766 B1
(45) Date of Patent: May 14, 2002

(54) PLUG AND RECEPTACLE CONNECTION FOR OPTICAL FIBER CABLES WITH ALIGNMENT FEATURE

(75) Inventor: Hsin Lee, Issaquah, WA (US)

(73) Assignee: Fiberon Technologies, Inc., Issaquah, WA (US)

( * ) Notice: Subject to any disclaimer, the term of this patent is extended or adjusted under 35 U.S.C. 154(b) by 0 days.

(21) Appl. No.: 09/649,283

(22) Filed: Aug. 28, 2000

(51) Int. Cl.[7] .................................................. G02B 6/38
(52) U.S. Cl. .............................. 385/56; 385/58; 385/60; 385/65
(58) Field of Search ............................ 385/56, 58, 60, 385/65

(56) References Cited

U.S. PATENT DOCUMENTS

| | | | | |
|---|---|---|---|---|
| 4,579,418 A | * | 4/1986 | Parchet et al. ............. | 350/96.2 |
| 4,634,214 A | * | 1/1987 | Cannon, Jr. et al. ....... | 350/96.2 |
| 5,181,267 A | * | 1/1993 | Gerace et al. ............... | 385/86 |
| 6,062,739 A | * | 5/2000 | Blake et al. ................. | 385/76 |
| 6,179,481 B1 | * | 1/2001 | Sung ........................... | 385/78 |
| 6,224,270 B1 | * | 5/2001 | Nakajima et al. ........... | 385/78 |
| 6,238,099 B1 | * | 5/2001 | Le Guen et al. ............ | 385/59 |

* cited by examiner

Primary Examiner—Phan T. H. Palmer
Assistant Examiner—Jennifer Doan
(74) Attorney, Agent, or Firm—Delbert J. Barnard

(57) ABSTRACT

A plug (10) is secured to an end of a first length of fiberoptic cable. A receptacle (14) is connected to an end of a second fiber topic cable. The receptacle component (14) includes a cylindrical sidewall (24) that includes an axial key slot (36). The plug (10) includes a shallow forward girth groove (50) that is immediately forwardly of a deeper rearward girth groove (52). A ring (32) is initially positioned with the deeper girth groove (52). A key (34) extends axially forwardly from ring (32). The ring (32) makes a loose fit in rearward girth groove (52) and a tight, interference fit with forward girth groove (50). Initially, with the ring (32) in the rearward girth groove (52), the plug (10) is moved into the socket (30) and the key (34) is started into key slot (36).

32 Claims, 4 Drawing Sheets

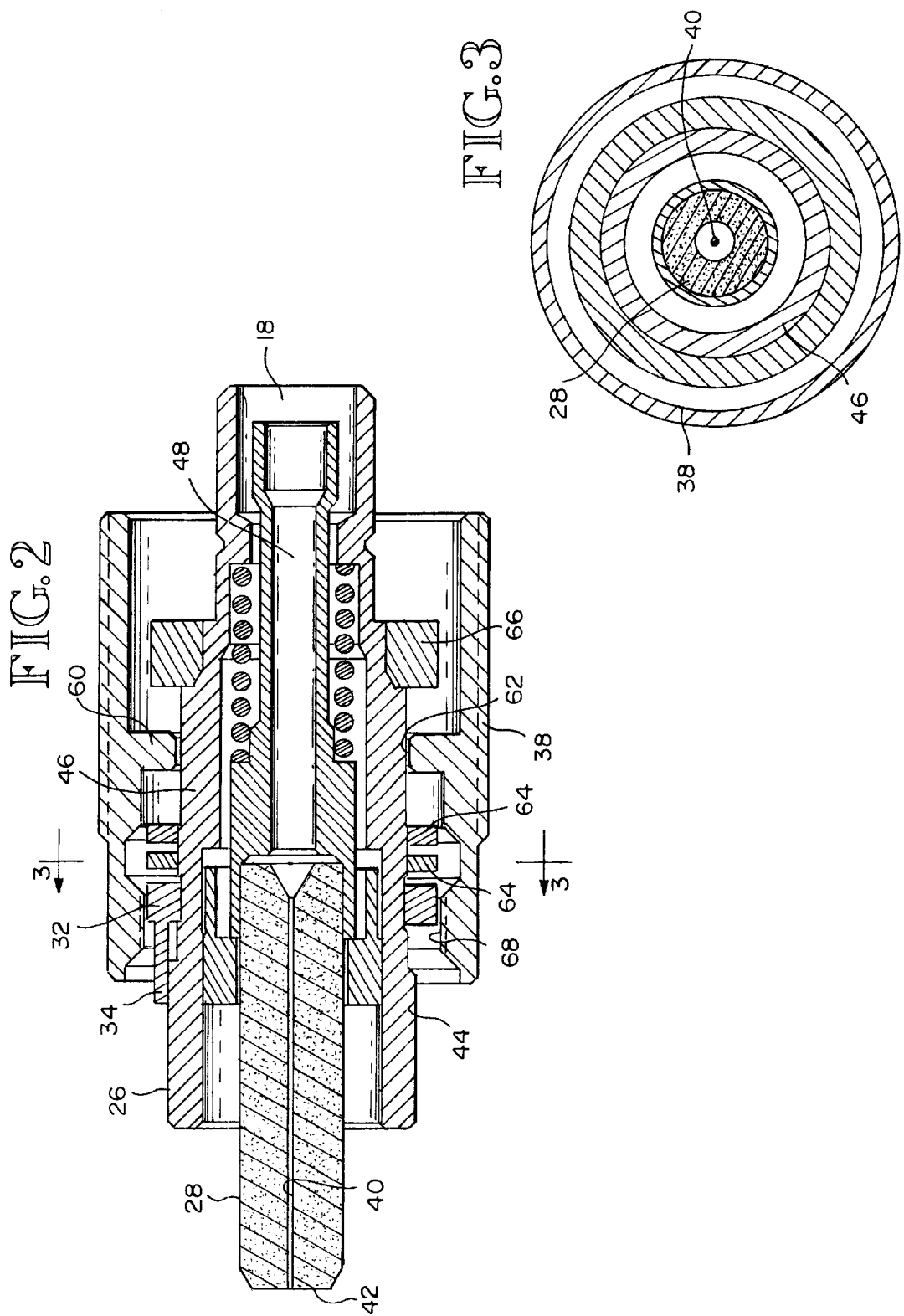

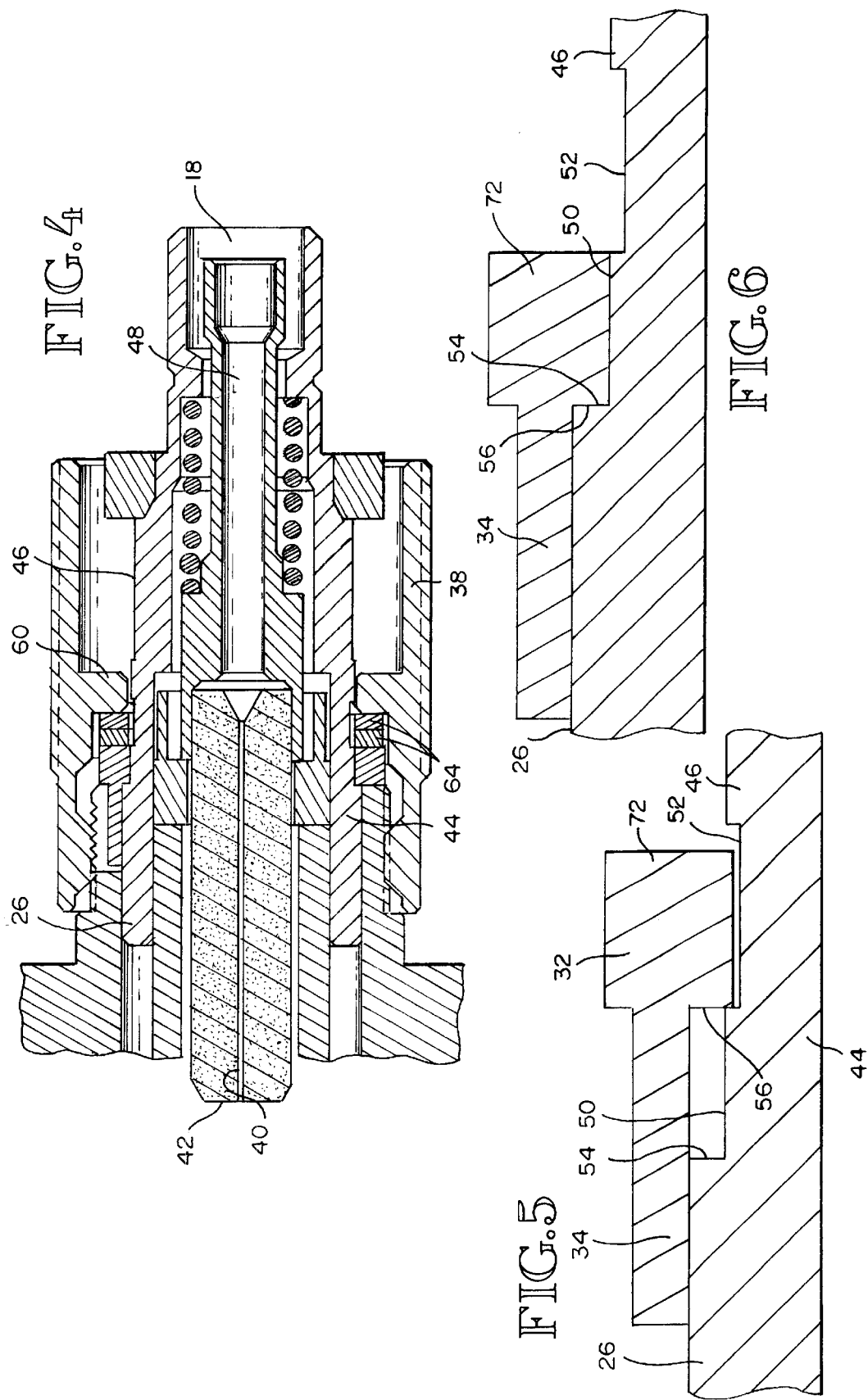

PLUG AND RECEPTACLE CONNECTION FOR OPTICAL FIBER CABLES WITH ALIGNMENT FEATURE

TECHNICAL FIELD

This invention relates to plug and receptacle connections for joining two fiber optic cables together for optical energy transmission from one to the other. More particularly, it relates to the provision of an alignment system comprising an alignment key on the plug and a key slot on the receptacle, in which the plug and the fiberoptics cable to which it is connected can be rotated in position relative to the key, the key slot and the other fiberoptics cable, until a desired rotational alignment of the two cables is achieved, and then the alignment key can be fixed in position on the plug so that in the future whenever it is inserted into the key slot the desired rotational alignment of the two cables is achieved.

BACKGROUND OF THE INVENTION

When the ends of two optical cables are connected together, with their optical fibers in axial alignment, for optical energy transmission from one cable to the other, optimum results are obtained when the optical fibers of the two cables are in a particular position of rotational alignment. U.S. Pat. No. 5,181,267, granted Jan. 19, 1993, to Jeffrey T. Gerace, Alan E. Plotts and Frederick H. Abendeschein, and assigned to AMP Incorporated of Harrisburg, Pa., provides the plug component of a plug and receptacle connection with a ring mounted alignment key and provides the receptacle component with a key slot adapted to receive the alignment key. A girth groove is formed in a sidewall of the plug and a hexagonal collar is provided immediately rearwardly of the girth groove. The collar provides six flats at its periphery representing six positions of adjustment. The ring is positioned on the plug, forwardly of the girth groove. The alignment key is aligned with the key slot and then the plug and the cable to which the plug is connected are rotated relative to the ring, the alignment key, the key slot and the other optical cable. When a desired alignment is found, the plug is rotated to place the closest flat on the collar in a position to be engaged by the tab on the ring. Then, the ring is moved rearwardly into the girth groove, moving with it the tab and positioning the tab on the selected flat. The engagement of the tab and the flat holds the ring and the alignment key in a set position on the plug body. Thereafter, the plug and receptacle connection can be disconnected and then reconnected and when reconnected the alignment of the two cables is established by inserting the key into the key slot. A problem with this arrangement is that it only allows for six azimuthal positions of the key on the plug.

An object of the present invention is to provide a polarizing ring with an alignment key in which the ring can be positioned in an infinite number of azimuthal positions around the body of the plug.

BRIEF SUMMARY OF THE INVENTION

The present invention includes providing a plug for an end of a fiberoptic cable with an elongated plug body that is characterized by an end portion having an outer end, a forward girth groove in said body spaced axially inwardly from said outer end, and a rearward girth groove in said body that is axially inwardly adjacent the forward girth groove. The rearward girth groove is deeper than the forward girth groove. A ring surrounds the plug body. The ring is sized to make a loose fit with the rearward girth groove and an interference fit with the forward girth groove. There is a key on the ring that projects axially forwardly from the ring onto the end portion of the plug body. The ring is initially positioned in the rearward groove so that the body can be rotated in position relative to the ring and key, for the purpose of aligning the optic fiber in the first fiberoptic cable with the optic fiber in a second fiberoptic cable to which the first cable is to be connected. After proper azimuthal alignment is achieved, the ring is pushed axially forwardly out from the rearward girth groove and into the forward girth groove. When the ring is in the forward girth groove, its interference fit with the forward girth groove holds the ring and the key fixed in position on the end portion of the plug body.

In preferred form, the ring is provided with a rear end against which a force can be applied for pushing the ring out from the rearward girth groove and into the forward girth groove. The rearward girth groove has a forward end wall and the ring has a forward end wall that is positioned to contact the forward end wall of the forward girth groove when the ring is pushed forwardly, so as stop further forward movement of the ring on the plug body.

In preferred form, a nut is mounted on the plug. The nut has a sidewall that surrounds the plug body and a forward end portion that surrounds the ring and the key. The forward end portion includes internal threads. In preferred form, the nut is provided with a radially inwardly directed internal flange, intermediate its ends. This flange has an inner diameter through which the plug body extends. Preferably, at least one annular bearing member surrounds the plug body at a location axially between the internal flange and the rear end of the ring. The plug body includes a lock ring rearwardly of the internal flange. The lock ring is positioned to make contact with the internal flange when the nut is moved rearwardly. This keeps the nut from moving rearwardly off of the plug body.

In preferred form, the plug includes a ferrule that projects axially forwardly from the plug body. The ferrule includes a longitudinal opening for receiving an optical fiber.

The invention also includes providing a connector for connecting confronting ends of first and second lengths of fiberoptic cable. The connector is characterized by a tubular receptacle adapted to be connected to an end of a first length of fiberoptic cable and a plug adapted to be connected to an end of the second length of fiber optic cable. The receptacle includes a sidewall defining a plug receiving socket opening. The sidewall includes an axial key slot. The plug is as previously described.

The ring on the plug is initially positioned in the rearward groove on the plug. The plug is then inserted into the socket and the key on the ring is placed in alignment with the axial key slot in the sidewall of the receptacle. Then, the connector body and the cable to which it is connected are rotated in position relative to the receptacle, the ring and the key, until the end of an optical fiber in the first length of fiberoptic cable is in a desired rotational position relative to the end of an optical fiber in the second length of fiberoptic cable. Then, the ring is forced axially forwardly out from the rearward girth groove and into the forward girth groove. When the ring is in the forward girth groove, its interference fit with the forward girth groove functions to hold the ring and the key fixed in position on the end portion of the plug body. Then, the plug can be detached from the receptacle during the normal course of things and can later be connected again to the receptacle and proper alignment of the two optical fibers will be reestablished by a simple axial movement of the key on the plug into the key slot in the sidewall of the receptacle.

In preferred form, a nut is mounted on the plug. The nut has a forward end portion that includes internal threads which mate with external threads on the sidewall of the receptacle. The nut includes a radially inwardly directed internal flange intermediate its ends. When the nut is rotated to thread it onto the receptacle, this flange exerts an axial force on the rear end of the ring, forcing the ring forwardly from the rearward girth groove into the forward girth groove. In preferred form, at least one annular bearing member surrounds the plug body at a location axially between the internal flange and rear end of the ring. The bearing member(s) transmits the axial movement of the flange into an axial force on the rear end of the ring.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals are used to designate like parts through the several views of the drawing, and:

FIG. 2 is a longitudinal sectional view of the plug component that is connected to an end of one of two fiberoptic cables that are to be connected, such view showing the key carrying ring in a rearward girth groove that is sized to permit easy rotation of the ring while it is in the rearward girth groove, such view also showing a forward girth groove that is shallower than the rearward girth groove;

FIG. 3 is a transverse sectional view taken through the plug, substantially along line 3—3 of FIG. 2;

FIG. 4 is a view like FIG. 2, but with the plug within the receptacle, a nut on the plug being secured to the receptacle, and the key carrying ring pushed forwardly into the forward girth groove, placing the key within the key slot in the sidewall of the receptacle;

FIG. 5 is an enlarged scale fragmentary view, in axial section, showing the loose fit of the key carrying ring in the rearward girth groove;

FIG. 6 is a view like FIG. 5, but showing the key carrying ring moved forward into the forward girth groove;

DETAILED DESCRIPTION OF THE INVENTION

Figure 1:
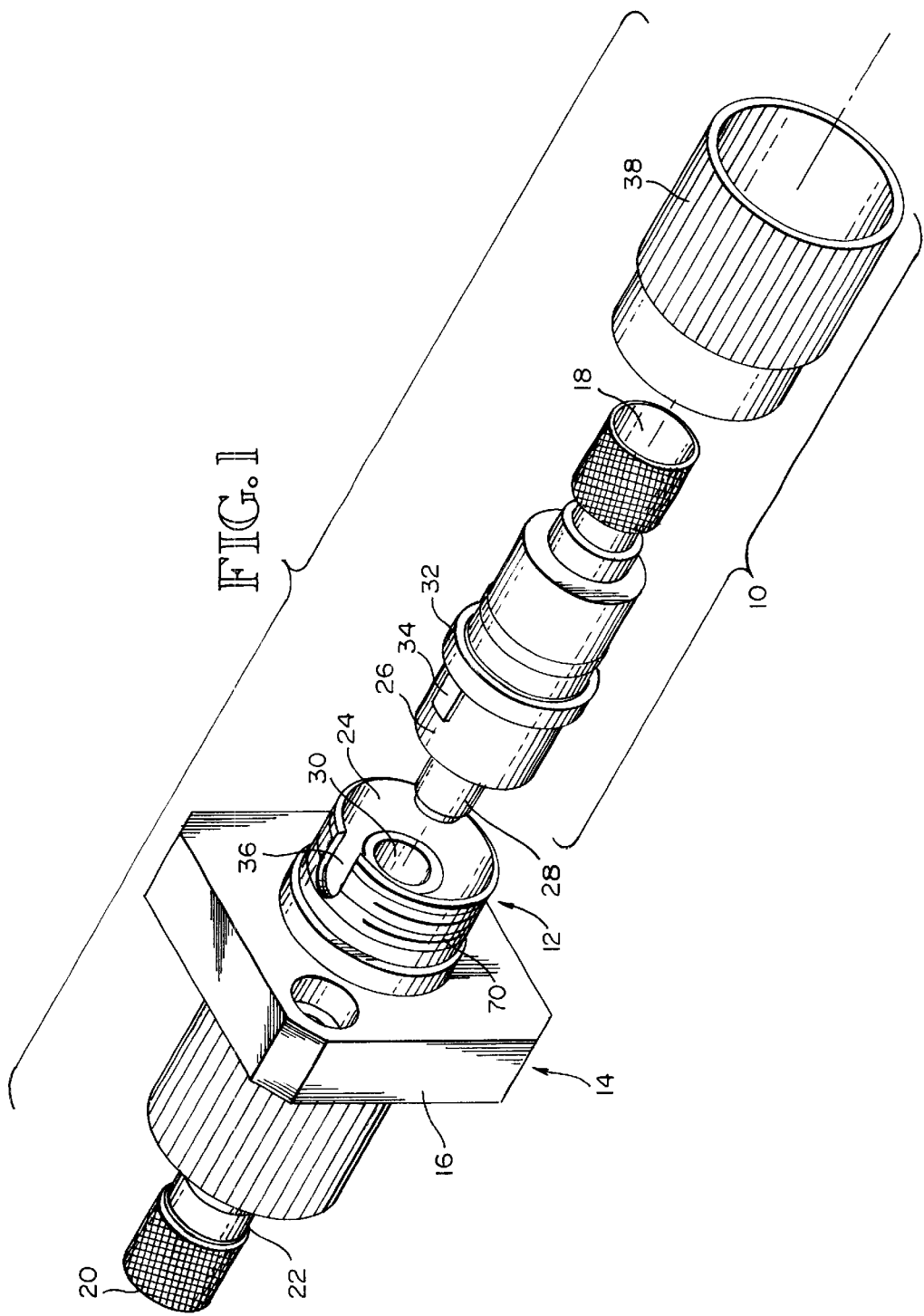
FIG. 1 is an exploded pictorial view of a plug and receptacle connector for fiberoptic cables, such view being taken from above and looking towards the top and one side of the connection, such view showing a ring on a plug body, a key on the ring, a receptacle that includes a sidewall, and a key receiving slot in the sidewall.
Figure 7:
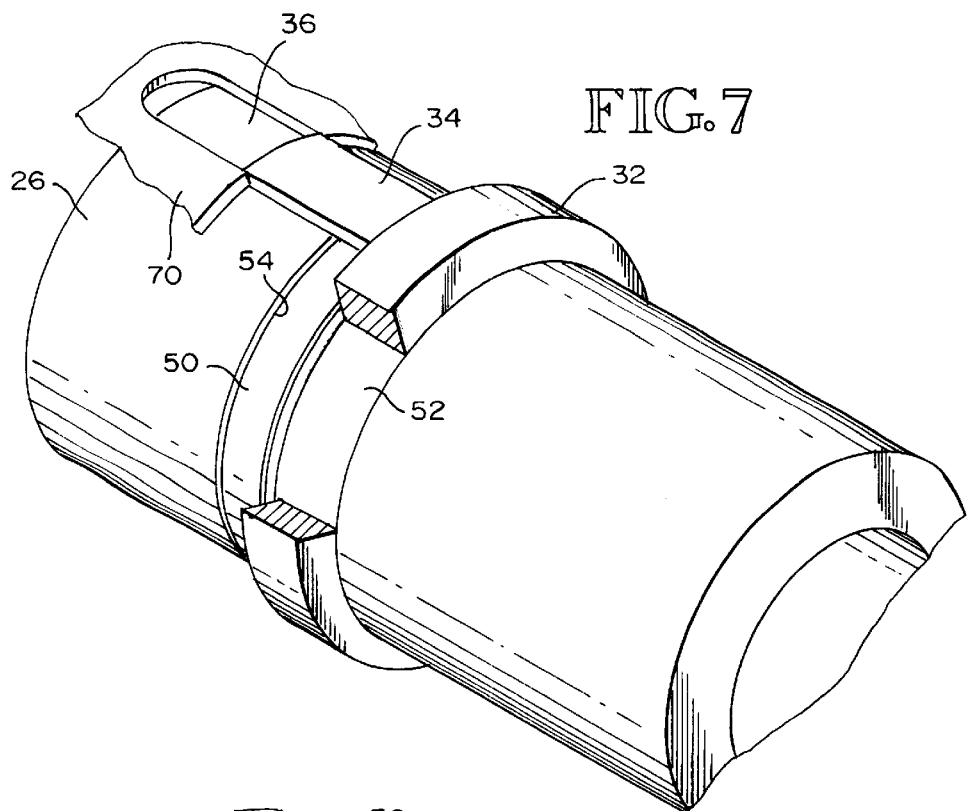
FIG. 7 is a fragmentary view of the plug body, with a foreground portion of the key carrying ring cut away, such view showing the ring within the rearward girth groove.
Figure 8:
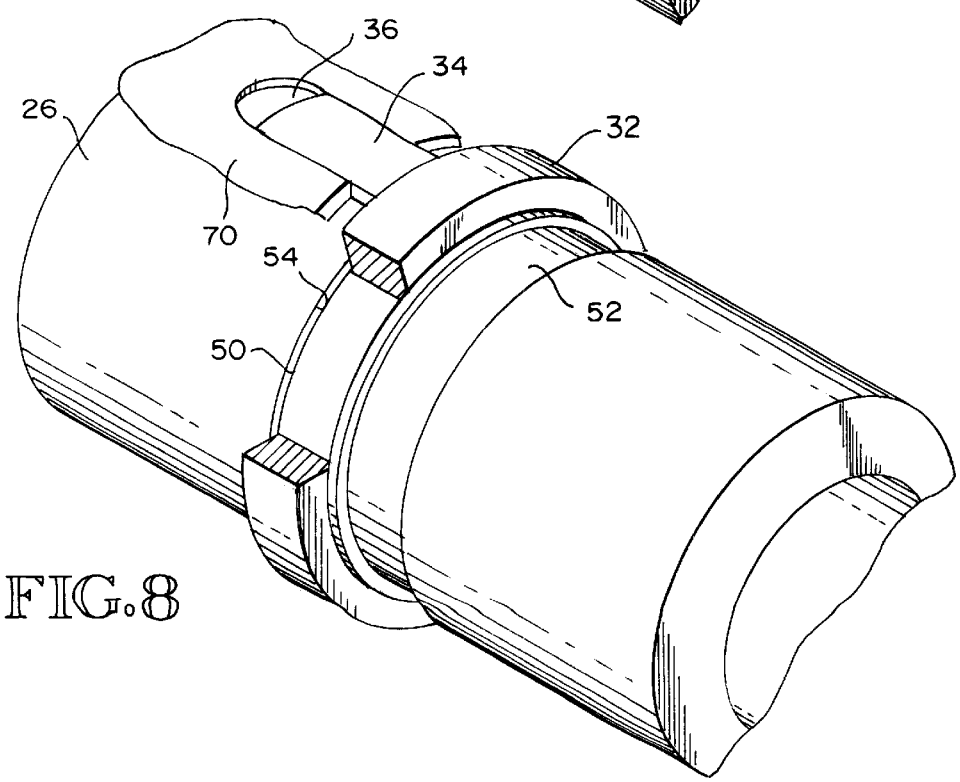
FIG. 8 is a view like FIG. 7, but showing the ring moved forwardly into the forward girth groove.

Referring to FIG. 1, the plug component 10 of a plug-receptacle connection 10, 14 is shown in axial alignment with a socket 12 that is a part of the receptacle component 14. The plug component 10 is adapted to be mounted onto an end portion of a first length of fiberoptic cable and the receptacle component 14 is adapted to be connected to an end portion of a second length of fiberoptic cable. Receptacle component 14 may or may not include a mounting flange 16, by which it is mounted on a housing. The end portion of the first length of fiberoptic cable enters into plug component 10 through end opening 18. The end portion of the second length of fiberoptic cable enters through an end opening 20 in an end portion 20 of receptacle component 14.

The socket 12 includes a cylindrical sidewall 24 into which plug end 26 extends. A ferrule 28 projects axially outwardly from end portion 26 and is received within a ferrule socket 30 that is within socket component 12. Plug component 10 includes a polarizing (or alignment) ring 32 and ring 32 includes an alignment key 34. The alignment key 34 is sized to fit within a key slot 36 that is formed in sidewall 24. As will hereinafter be described, the polarizing ring 32 can be fixed in position on the forward portion 26 of the plug body, then when the key 34 is inserted into the key slot 36, the optical fiber within the first length of optical cable has a set rotational orientation relative to the optical fiber in the second length of optical cable. As will also be hereinafter described in more detail, the plug component 10 includes a nut 38 having a forward end portion that is internally threaded so that it can be threaded onto the external threads on sidewall 24. A threading of the nut 38 onto the sidewall 34 firmly connects the plug body and the first optical cable to the receptacle conduit 12 and the second optical cable. The manner in which the optical cable is connected to the plug component 10 is not a part of the present invention but a typical manner of connecting is disclosed by the aforementioned U.S. Pat. No. 5,181,267. The optical cable is bared at its end so as to expose the optical fiber and enable it to be positioned within the axial opening 40 formed in the ferrule 28. The optical fiber is trimmed flush with the end surface 42 of ferrule 28 and is secured to the ferrule 28 by use of a suitable adhesive. When the plug component 10 is connected to the receptacle component 14, a similar end surface on a second ferrule that is within the receptacle component 14 is contiguous to the end surface 42. A second optical fiber extending through a center passageway in the second ferrule, is held in the second ferrule by a suitable adhesive and its end is cut flush with the end surface of the second ferrule. The two optical fibers are in coaxial alignment and their ends at least substantially touch each other. The receptacle 14 is per se not a part of the present invention. For that reason, no further details of the receptacle 14 are illustrated and described.

Referring to FIGS. 2–8, the plug body 44 is shown to include in addition to the forward end portion 26, a rearward portion 46 that is tubular and includes the rear end opening 18. It also includes a central opening 48 that receives a portion of the first fiberoptic cable that includes a buffer covered fiber portion that is immediately rearwardly of the bared fiber portion that is within the ferrule opening 40.

Important to the present invention is that the forward portion 26 and the rearward portion 46 of the plug body 44 are separated by two girth grooves. They are a forward girth groove 50 and a deeper rearward girth groove 52. It can also be said that girth groove 50 is shallower than girth groove 52. The axial length of girth groove 50 may be shorter than, equal to or longer than the length of the ring 32. An important feature is that girth groove 50 includes a forward wall 52 that serves as a ring stop, as will hereinafter be described in more detail. The rearward girth groove 52 may have an axial length that is substantially equal to or greater than the length of ring 32.

Ring 32 makes a loose fit in girth groove 52 and makes an interference fit in girth groove 50. When ring 32 is in girth groove 52, it can be easily rotated in position around the plug body 44. Or, perhaps more correctly, the plug body 44 can be freely rotated in position relative to the ring 32.

Ring 32 must be forced axially forwardly in order to move it from girth groove 52 into girth groove 50. When it is in girth groove 50, the ring 32 makes a tight interference fit with the girth groove 50. That is, there is a tight friction fit between the ring 32 and the base of the groove 50 which is strong enough to secure ring 32 in azimuthal position on plug body 44, and also hold it against moving rearwardly back into the girth groove 52. Girth groove 50 includes a forward end wall 54 which is contacted by the forward end wall 56 on ring 32, when the ring 32 is in its forward most position in the girth groove 50. This contact of surface 56 against surface 54 stops any additional forward movement of the ring 32 relative to the plug body 44.

Referring to FIGS. 2 and 4, the nut 38 preferably has an inwardly directed radial flange 60 defining a center opening 62 that is slightly larger in diameter than the rear portion 46 of plug body 44. One or two bearing rings 64 are positioned on the plug body portion 46 and the ring 32 is positioned within girth groove 52. Then the nut is slipped onto this assembly, from the rear of the assembly. Next, a retainer ring 66 is secured to the rear portion 46 of the plug body 44. As will be apparent, the retainer ring 66 is in a path of interference with the flange 60 and will prevent the nut 38 from moving rearwardly off of the plug body 44. The forward end portion of nut 38 is internally threaded at 68 with threads that match external threads 70 on the sidewall 24 of receptacle component 14. Following insertion of the ferrule 28 into the socket opening 30, and the key 34 into the key slot 36 and proper rotation alignment of the two cables, the nut 38 is moved forwardly and rotated to screw its threads 68 onto the threads 70. As shown by FIG. 4, there is sufficient thread travel to enable flange 60 to move forwardly against the bearing (s) 64 and move the bearing(s) 64 against the rear end 72 of ring 32. As rotation of nut 38 is continued, the flange 60 moves the bearing(s) 64 axially forwardly. The forward movement of bearing(s) 64 against end surface 72 exerts an axial force on the ring 32, forcing it out from girth grooves 52 and into girth groove 50. The provision of bearing(s) 64 converts the forward and rotational movement of flange 60 into an axial force acting on ring 32. In other words, bearing(s) 64 prevents the rotation of flange 60 from wanting to rotate the ring 32. In another embodiment, the ring 32 may be forced forwardly in a different manner.

In operation, plug component 10 is connected to an end of a first length of a fiberoptical cable and receptacle component 14 is connected to the end of a second length of fiberoptic cable. Then, ferrule 28 is moved towards and into socket 30 and key 34 is moved towards and into key slot 36. At this time, the ring 32 is within girth groove 52. Key 34 is started in the key slot 36, so that engagement of the key 34 with the sides of the key slot 36 will prevent ring 32 from rotating relative to receptacle sidewall 24. At this time, the plug body 44 is freely rotatable in position relative to the ring 32. Plug body 44, and the fiberoptic cable to which it is connected, are rotated until the optical fiber in the cable is as close as possible to a most favorable alignment with the optical fiber in the second fiberoptic cable. At this time, rotation of plug body 44 and the first fiberoptic cable is stopped and the ring 32 is forced axially forwardly to move it out from girth groove 52 and into girth groove 50 and also move the key 34 further into the key slot 36. As explained above, this may be done by rotating the nut 38 so as to thread it onto the cylindrical wall 24 of the receptacle component 14, so that the forward motion of flange 60 will push the ring 32 axially forwardly and out from girth groove 52 and into girth groove 50. Once the ring 32 is within girth groove 50, it and the key 32 are fixed in position on the plug body 44. Therefore, the nut 38 can be unscrewed and the plug component 10 can be detached from the receptacle component 14. Then, at a later time, plug component 10 can be reattached to receptacle component 14 and the alignment of the two optical fibers will remain as established initially by the setting in place of the ring 32 and the key 34.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A plug for an end of a fiberoptic cable, comprising:
    an elongated plug body including an end portion having an outer end, a first girth groove in said body spaced axially inwardly from said outer end, and a second girth groove in said body that is axially inwardly adjacent the first girth groove, said second girth groove being deeper than the first girth groove;
    a ring surrounding said plug body, said ring being sized to make a loose fit with the second girth groove and an interference fit with the first girth groove; and
    a key on said ring projecting axially forwardly from the ring onto the end portion of the plug body,
    whereby the ring can be initially positioned in the second groove and the body can be rotated in the position relative to the ring and key, and then the ring can be pushed axially forwardly out from the second girth groove into the first girth groove and when it is in the first girth groove, its interference fit with the first girth groove will hold the ring and the key fixed in position, on the end portion of the plug body.

2. The plug of claim 1, wherein said ring has a rear end against which a force can be applied for pushing the ring out from the second girth groove and into the first girth groove.

3. The plug of claim 2, wherein the first girth groove has a forward end wall and the ring has a forward end wall that is positioned to contact the forward end wall of the first girth groove when the ring is pushed forwardly, so as to stop further forward movement of the ring on the plug body.

4. The plug of claim 1, wherein the first girth groove has a forward end wall and the ring has a forward end wall that is positioned to contact the forward end wall of the first girth groove when the ring is pushed forwardly, so as to stop further forward movement of the ring on the plug body.

5. The plug of claim 1, comprising a nut having a sidewall that surrounds the plug body, said nut having a forward end portion that surrounds the ring and the key and includes internal threads.

6. The plug of claim 5, wherein the nut includes a radially inwardly directed internal radial flange intermediate its ends and having an inner diameter through which the plug body extends.

7. The plug of claim 6, comprising at least one annular bearing member surrounding the plug body axially between the internal flange and the rear end of the ring.

8. The plug of claim 6, comprising a lock ring on the plug body rearwardly of the internal flange, said lock ring being positioned to make contact with the internal flange when the nut is moved rearwardly, and functioning to by such contact keep the nut from moving rearwardly off of the plug body.

9. The plug of claim 6, comprising a lock ring on the plug body rearwardly of the internal flange, said lock ring being positioned to make contact with the internal flange when the nut is moved rearwardly, and functioning to by such contact keep the nut from moving rearwardly off of the plug body.

10. The plug of claim 1, further comprising a ferrule projecting axially forwardly from the plug body, said ferrule including a longitudinal opening for receiving an optical fiber.

11. The plug of claim 10, wherein said ring has a rear end against which a force can be applied for pushing the ring out from the second girth groove and into the first girth groove.

12. The plug of claim 11, wherein the first girth groove has a forward end wall and the ring has a forward end wall that is positioned to contact the forward end wall of the first girth groove when the ring is pushed forwardly, so as to stop further movement of the ring on the plug body.

13. The plug of claim 10, wherein the first girth groove has a forward end wall and the ring has a forward end wall that is positioned to contact the forward end wall of the first girth groove when the ring is pushed forwardly, so as to stop further forward movement of the ring on the plug body.

14. The plug of claim 10, comprising a nut having a sidewall that surrounds the plug body, said nut having a forward end portion that surrounds the ring and the key and includes internal threads.

15. The plug of claim 14, wherein the nut includes a radially inwardly directed internal flange intermediate its ends and having an inner diameter through which the plug body extends.

16. The plug of claim 15, comprising at least one annular bearing member surrounding the plug body axially between the internal flange and the rear end of the ring.

17. A connector for connecting confronting ends of first and second lengths of fiberoptic cable, said connector comprising:

a tubular receptacle adapted to be connected to the end of said first length of fiberoptic cable, said receptacle including a sidewall defining a plug receiving socket opening, said sidewall including a radially outwardly opening axial slot;

a plug adapted to be connected to the end of said second length of fiberoptic cable and further adapted for insertion into the socket opening in the receptacle, said plug including an elongated plug body having an end portion with an outer end, a first girth groove in said body spaced axially inwardly from said outer end, and a second girth groove in said body that is axially inwardly adjacent the first girth groove, said second girth groove been deeper than the first girth groove;

a ring surrounding said plug body, said ring being sized to make a loose fit with the second girth groove and an interference fit with the first girth groove; and a key on said ring projecting axially forwardly from the ring onto the end portion of the plug body, whereby the ring can be initially positioned in the second groove, and the plug can be inserted into the socket, with the key in alignment with the axial slot in the sidewall of the receptacle, and then the body can be rotated in position relative to the receptacle, the ring and key, until the end of the first length of fiberoptic cable is in a desired position relative to the end of the second length of fiberoptic cable, and then the ring can be pushed axially forwardly out from the second girth groove into the first girth groove and when it is in its first girth groove, its interference fit with the first girth groove will hold the ring and the key fixed in position on the end portion of the plug body.

18. The connector of claim 17, wherein said ring has a rear end against which a force can be applied for pushing the ring out from the second girth groove and into the first girth groove.

19. The connector of claim 18, wherein the first girth groove has a forward end wall and the ring has a forward end wall that is positioned to contact the forward end wall of the first girth groove when the ring is pushed forwardly, so as to stop further forward movement of the ring on the plug body.

20. The connector of claim 17, wherein the first girth groove has a forward end wall and the ring has a forward end wall that is positioned to contact the forward end wall of the first girth groove when the ring is pushed forwardly, so as to stop further forward movement of the ring on the plug body.

21. The connector of claim 17, comprising a nut having a sidewall that surrounds the plug body, said nut having a forward end portion that surrounds the ring and the key and includes internal threads.

22. The connector of claim 21, wherein the nut includes a radially inwardly directed internal radial flange intermediate its ends and having an inner diameter through which the plug body extends.

23. The connector of claim 22, comprising at least one annular bearing member surrounding the plug body axially between the internal flange and the rear end of the ring.

24. The connector of claim 22, comprising a lock ring on the plug body rearwardly of the internal flange, said lock ring being positioned to make contact with the internal flange when the nut is moved rearwardly, and functioning to by such contact keep the nut from moving rearwardly off of the plug body.

25. The connector of claim 17, further comprising a ferrule projecting axially forwardly from the plug body, said ferrule including a longitudinal opening for receiving an optical fiber.

26. The connector of claim 25, wherein said ring has a rear end against which a force can be applied for pushing the ring out from the second girth groove and into the first girth groove.

27. The connector of claim 25, wherein the first girth groove has a forward end wall and the ring has a forward end wall that is positioned to contact the forward end wall of the first girth groove when the ring is pushed forwardly, so as to stop further movement of the ring on the plug body.

28. The connector of claim 25, wherein the first girth groove has a forward end wall and the ring has a forward end wall that is positioned to contact the forward end wall of the first girth groove when the ring is pushed forwardly, so as to stop further forward movement of the ring on the plug body.

29. The connector of claim 25, comprising a nut having a sidewall that surrounds the plug body, said nut having a forward end portion that surrounds the ring and the key and includes internal threads.

30. The connector of claim 29, wherein the nut includes a radially inwardly directed internal flange intermediate its ends and having an inner diameter through which the plug body extends.

31. The connector of claim 30, comprising at least one annular bearing member surrounding the plug body axially between the internal flange and the rear end of the ring.

32. The connector of claim 17, comprising a lock ring on the plug body rearwardly of the internal flange, said lock ring being positioned to make contact with the internal flange when the nut is moved rearwardly, and functioning to by such contact keep the nut from moving rearwardly off of the plug body.

* * * * *